United States Patent
Nardi et al.

(10) Patent No.: US 8,065,898 B2
(45) Date of Patent: Nov. 29, 2011

(54) METHOD AND ARTICLE FOR IMPROVED ADHESION OF FATIGUE-PRONE COMPONENTS

(75) Inventors: Aaron T. Nardi, East Granby, CT (US); Blair A. Smith, South Windsor, CT (US); Timothy R. Boysen, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 678 days.

(21) Appl. No.: 12/181,349

(22) Filed: Jul. 29, 2008

(65) Prior Publication Data
US 2010/0028713 A1    Feb. 4, 2010

(51) Int. Cl.
*C21D 7/08* (2006.01)
*B32B 15/04* (2006.01)

(52) U.S. Cl. .............. 72/53; 228/119; 428/433

(58) Field of Classification Search ........... 72/47, 53; 228/119; 427/191, 192; 428/433
See application file for complete search history.

(56) References Cited

U.S. PATENT DOCUMENTS

| | | | |
|---|---|---|---|
| 3,321,338 A | 5/1967 | Caubet | |
| 4,053,330 A | 10/1977 | Henricks | |
| 4,454,740 A | 6/1984 | Neal | |
| 4,514,470 A | 4/1985 | Rosenthal | |
| 4,552,784 A * | 11/1985 | Chu et al. | 427/192 |
| 4,588,480 A | 5/1986 | Thoma | |
| 4,800,132 A | 1/1989 | Grunwald | |
| RE33,800 E | 1/1992 | Fornwalt | |
| H1207 H | 7/1993 | Smith | |
| 5,464,524 A | 11/1995 | Ogiwara | |
| 5,516,586 A * | 5/1996 | Singer et al. | 428/433 |
| 6,444,259 B1 * | 9/2002 | Subramanian et al. | 427/191 |
| 6,458,317 B1 | 10/2002 | Koskinen | |
| 6,475,637 B1 | 11/2002 | Strutt | |
| 6,491,208 B2 * | 12/2002 | James et al. | 228/119 |
| 6,598,441 B1 * | 7/2003 | Cavaliere et al. | 72/47 |
| 7,192,501 B2 * | 3/2007 | Westre et al. | 72/53 |

FOREIGN PATENT DOCUMENTS

| | | |
|---|---|---|
| EP | 1816236 A1 | 8/2007 |
| EP | 1862643 A2 | 12/2007 |
| GB | 972532 A | 10/1964 |
| JP | 1159358 | 6/1989 |
| WO | WO2005121387 A1 | 12/2005 |

OTHER PUBLICATIONS

European Search Report mailed on Nov. 25, 2009 for EP 09250956.
SAE Aerospace, Copyright 2003 SAE International; Aerospace Material Specification, http://www.sae.org.
Standard Practice for preparation of Titanium and Titanium Alloys for Electroplating; ASTM International, (Reapproved 2003).

(Continued)

*Primary Examiner* — David Jones
(74) *Attorney, Agent, or Firm* — Carlson, Gaskey & Olds, P.C.

(57) ABSTRACT

A method of processing an article includes mechanically working an article having a metallic layer disposed on a titanium substrate and establishing a residual stress region that extends through the metallic layer and at least partially into the titanium substrate.

14 Claims, 2 Drawing Sheets

OTHER PUBLICATIONS

Liu Daoxin et. al., The Effect of Plasma Nitriding and Shot Peening on the Fretting Damage Resistance of Ti Alloy, Transaction of Materials and Heat Treatment, Published Sep. 30, 2001, vol. 22.3, pp. 49-54.

Luo Jianjun et al., Surface Protection of Ti-6Al-4V Alloy from Fretting Damage, Rare Metal Materials and Engineering, vol. 24.4, Publications Aug. 30, 1995, pp. 53-58.

Zhang, Wei et al., Sliding Wear Study of Ion-beam Mixing Ni-Mo Multilayer Films on Steel, Wear, Published Dec. 31, 1996, vol. 197, pp. 228-232.

Haseeb, et al. "Fretting Wear of Metallic Multilayer Films", Thin Solid Films, col. 444, pp. 197-207.

* cited by examiner

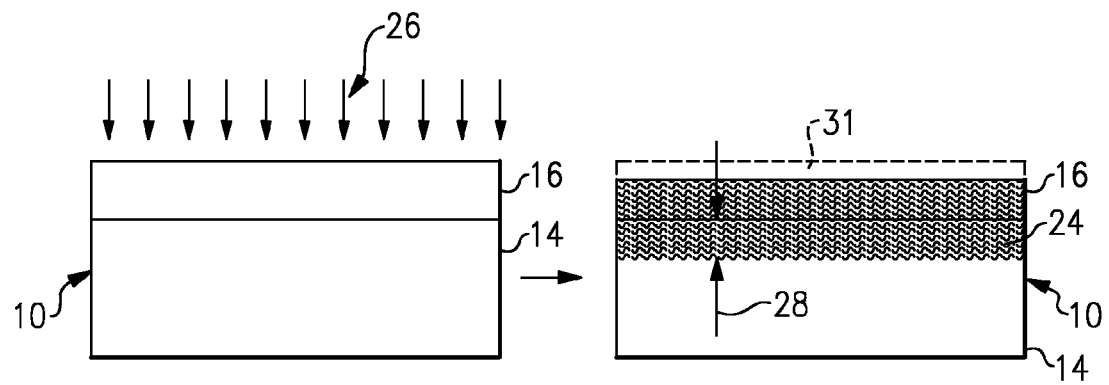
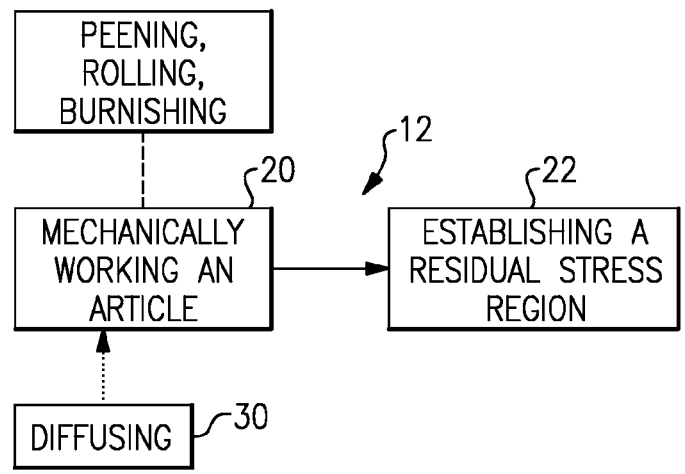

METHOD AND ARTICLE FOR IMPROVED ADHESION OF FATIGUE-PRONE COMPONENTS

BACKGROUND OF THE INVENTION

This disclosure relates to titanium components and, more particularly, to a method and article for obtaining improved adhesion of fatigue-prone components.

Titanium alloys are often used for a combination of high strength and relatively low weight compared to other alloys, such as steel. Titanium alloy components are often exposed to relatively harsh operating conditions, such as fatigue stresses or wear against other parts. For example, to improve resistance to fatigue, the titanium alloy component may be peened to provide a residual compressive surface zone that offsets applied fatigue tensile stresses. Alternately, to improve wear resistance, the titanium alloy component may be plated with a relatively hard material.

Peening and plating have been effective, respectively, for fatigue and wear resistance. However, for a combination of fatigue and wear conditions, peening and plating are incompatible. For instance, elevated temperatures are used in post-plating heat treating processes to improve adhesion between the titanium alloy and a plating material, but the heat treating relieves any residual compressive stress in the titanium alloy component from peening for improved fatigue resistance and thereby negates the beneficial effects of the peening.

SUMMARY OF THE INVENTION

An example method includes mechanically working an article having a metallic layer disposed on a titanium substrate and establishing a residual stress region that extends through the metallic layer and at least partially into the titanium substrate.

In another aspect, an example method includes forming a metallic layer on a titanium substrate to provide an article, diffusing together at least a portion of the metallic layer and at least a portion of the metallic substrate to form a diffusion region, mechanically working the article, and establishing a residual stress region that extends through the metallic layer, the diffusion region, and at least partially into the titanium substrate.

An example article includes a titanium substrate and a metallic layer disposed on the titanium substrate. A residual stress region extends through the metallic layer and at least partially into the titanium substrate.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 schematically illustrates an example article through steps of an example method shown in FIG. 2.

FIG. 2 illustrates an example method for processing the article of FIG. 1.

DETAILED DESCRIPTION OF THE PREFERRED EMBODIMENT

Figure 3:
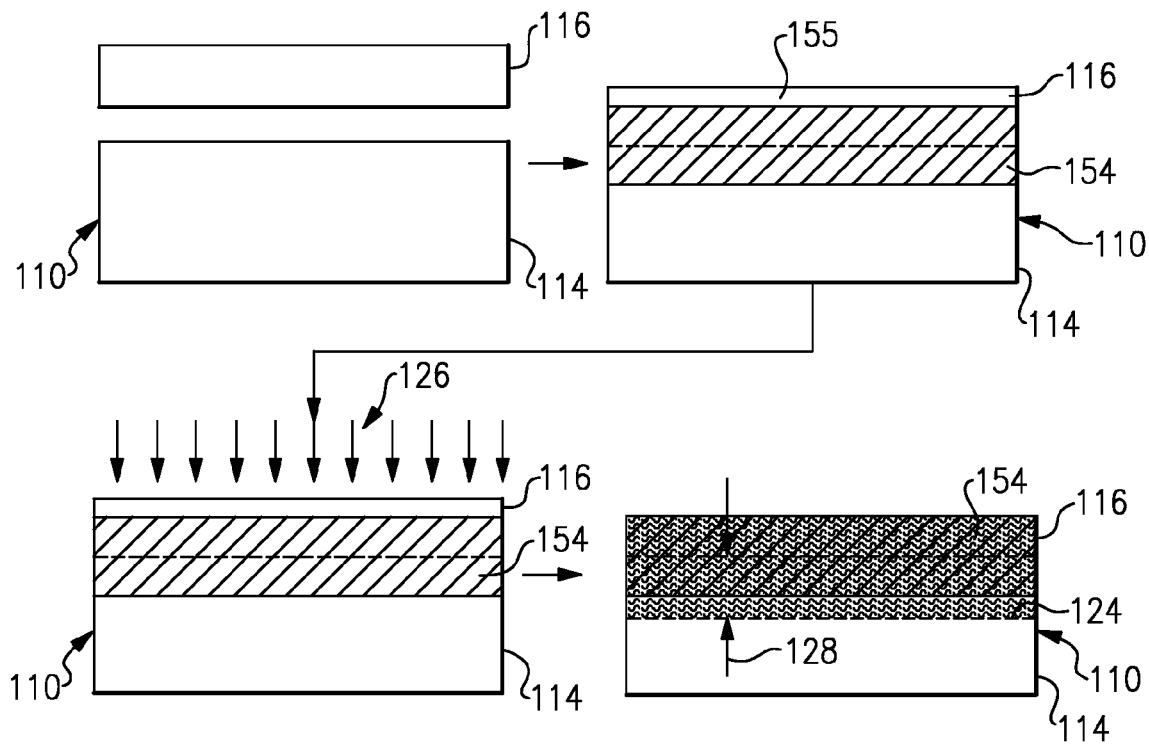
FIG. 3 illustrates another example article through steps of an example method shown in FIG. 4.

FIG. 1 schematically illustrates an example article 10 during processing according to an example method 12 illustrated in FIG. 2. As will be discussed, the example method 12 may be used to improve adhesion between different materials of the article 10. In the illustrated example, the article 10 includes a titanium substrate 14 (FIG. 1) and a metallic layer 16 on the titanium substrate 14. In the given example, the article 10 is shown generically; however, the article 10 may be any type of article that is subject to fatigue and/or wear conditions (i.e., a fatigue-prone article). For example, the article 10 may be an aerospace component, such as an actuator used on an aircraft. It is to be understood, however, that the article 10 is not limited to any particular type.

The example method 12 may be used to improve adhesion between the titanium substrate 14 and the metallic layer 16 of the article 10. In this regard, the method 12 includes a step 20 of mechanically working the article 10 and a step 22 of establishing a residual stress region 24 that extends through the metallic layer 16 and at least partially into the titanium substrate 14. The residual stress region 24 provides a compressive stress on the outer surface of the article 10 to thereby enhance the fatigue resistance of the article 10.

The mechanical working of step 20 is not limited to any particular type of process. In one example, the mechanical working (indicated by the arrows 26 illustrated in FIG. 1) includes peening. In other examples, the mechanical working 26 may include rolling and/or burnishing. The intensity of the mechanical working may be controlled to establish a desired depth 28 that the residual stress region 24 extends into the article 10, and thus into the titanium substrate 14. For instance, if peening is used, the size of the peening media and the intensity of the peening process may be selected to achieve a desired depth 28. The size of the peening media and the intensity of the peening process may also depend upon a thickness of the metallic layer 16 and/or the type of metal selected for the metallic layer 16. In at least one example, the metallic layer 16 is nickel and is less than about 0.005 inches (0.127 millimeters) thick. In a further example, the thickness is about 0.0001-0.0005 inches (0.00254-0.0127 millimeters) and may be 0.0003 inches (0.00762 millimeters). The depth 28 of the residual stress region 24 is about 0.115 inches (2.921 millimeters). For instance, the given example depth 28 may be achieved using a 0.02 inch (0.51 millimeter) shot size at an Almen intensity of 0.015.

The metallic layer 16 may be any type of transition metal from the Periodic Table. In the examples above, the metallic layer 16 is nickel, cobalt, copper, or a combination thereof; however, the metallic layer 16 may also include another type of transition metal, or mixtures thereof. Likewise, the titanium substrate 14 may be any type of titanium alloy. In one example, the titanium alloy includes about 5.5-6.75 wt % aluminum, about 3.5-4.5 wt % vanadium, and a balance of titanium. The titanium alloy may include amounts of other elements that do not materially affect the properties of the titanium alloy, elements that are impurities, or elements that are unmeasured or undetectable in the titanium alloy. The term "about" as used in this description relative to compositions or other values refers to possible variation in the given value, such as normally accepted variations or tolerances in the art.

Optionally, the method 12 may also include a step 30 of diffusing together at least a portion of the metallic layer 16 and at least a portion of the titanium substrate 14. For example, the diffusing may be conducted at a diffusion temperature corresponding to the type of metal selected for the metallic layer 16 and the titanium substrate 14. In one example where the metallic layer 16 is copper, cobalt, or nickel, the diffusion temperature may be at least about 1400° F. (760° C.) and be conducted under vacuum. For other metals selected for the metallic layer 16, the diffusion temperature may be selected based on a desired intermetallic phase from a time-temperature-transition diagram of the metal and titanium.

The diffusion time may depend upon the degree of diffusion that is desired. In some examples, the diffusion time is between several minutes and twenty-four hours, but longer or shorter times may also be used. After the diffusion at step 30, the article 10 may be mechanically worked at step 20 as described above. Diffusing prior to mechanically working the article 10 limits or prevents the metallic layer 16 from detaching from the titanium substrate 14 during the mechanical working. The diffusing also consolidates the metallic layer through atomic transport to fill micro-voids in the metallic layer 16.

After establishing the residual stress region 24 at step 22, a second metallic layer 31 may be formed on the metallic layer 16. For instance, the second metallic layer 31 may include a different transition metal than the transition metal of the metallic layer 16, but may also be the same transition metal as the metallic layer 16.

Figure 4:
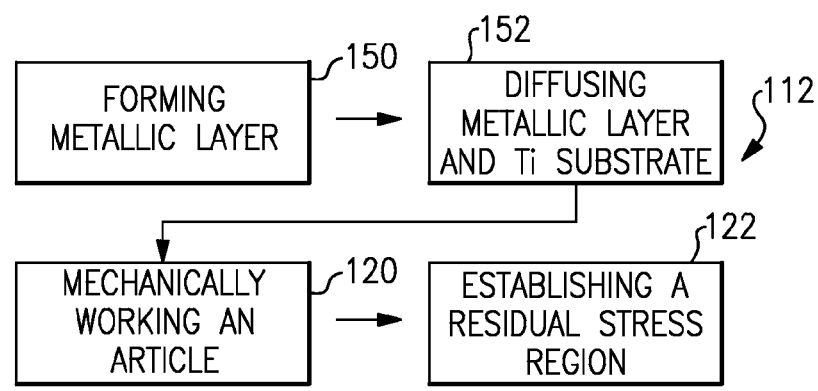
FIG. 4 illustrates an example method of processing the article illustrated in FIG. 3.

FIG. 3 illustrates another example article 110 during processing according to an example method 112 as illustrated in FIG. 4. In this disclosure, like reference numerals designate like elements where appropriate, and reference numerals with the addition of one-hundred or multiples thereof designate modified elements. The modified elements incorporate the same features and benefits of the corresponding modified elements, except where stated otherwise. Similar to the previous examples, the method 112 may be used to facilitate improvement of fatigue resistance of the article 110. In this example, the article 112 includes a titanium substrate 114 (FIG. 3) and a metallic layer 116 disposed on the titanium substrate 114.

The method 112 includes a step 150 (FIG. 4) of forming the metallic layer 116 on the titanium substrate 114 and a step 152 of diffusing the metallic layer 116 at least partially into the titanium substrate 114. For example, steps 150 and 152 are conducted prior to step 120 of mechanically working the article 110 and step 122 of establishing a residual stress region 124, which are similar to steps 20 and 22 of the prior example.

In the given example, the metallic layer 116 may be formed using any suitable type of forming process. For example, the forming may include a nickel striking, physical vapor deposition, chemical vapor deposition, thermal spray, or the like. Other types of processes may alternatively be used, and the step 150 is not limited to any particular type of forming process. If a striking process is used, for example to form the metallic layer 116 of a nickel strike material, a nickel strike solution may be used. For example, the nickel strike solution may include nickel chloride, nickel sulfate, nickel sulfanate, or combinations thereof with an acid. For example, the acid may be hydrochloric acid, sulfamic acid, sulfuric acid, or combinations thereof.

After forming the metallic layer 116 on the titanium substrate 114, the metallic layer 116 and the titanium substrate 114 are diffused together at step 152 to form a diffusion region 154. Similar to as described above, the diffusion may be conducted at a temperature corresponding to the type of metal selected for the metallic layer 116 and the titanium substrate. In one example for cobalt, nickel, or copper as the metallic layer 116, the temperature is at least 1400° F. (760° C.) and for times corresponding to the type of metal selected for the metallic layer 116. In this example, the metallic layer 116 partially diffuses with the titanium substrate 114 such that an outermost surface region 155 of the metallic layer 116 remains substantially as-formed with substantially no compositional change. For other metals selected for the metallic layer 16, the diffusion temperature may be selected based on a desired intermetallic phase from a time-temperature-transition diagram of the metal and titanium.

The article 110 is then mechanically worked at step 120, as illustrated by arrows 126 in FIG. 3 to establish the residual stress region 124 that extends through the metallic layer 116, the diffusion region 154, and at least partially into the titanium substrate 114.

As discussed above, the intensity of the mechanical working at step 120 may be controlled to establish a desired depth 128 that the residual stress region 124 extends into the article 110, and thus into the titanium substrate 114.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of processing an article, comprising:
   mechanically working an article having a metallic layer disposed on a titanium substrate; and
   establishing a residual stress region that extends through the metallic layer and at least partially into the titanium substrate.

2. The method as recited in claim 1, wherein mechanically working the article includes peening the article.

3. The method as recited in claim 1, further comprising diffusing together at least a portion of the metallic layer and at least a portion of the titanium substrate prior to the mechanical working.

4. The method as recited in claim 3, including diffusing at a diffusion temperature corresponding to a type of metal selected for the metallic layer and the titanium substrate.

5. The method as recited in claim 1, further comprising controlling an intensity of the mechanical working to establish a depth that the residual stress region extends into the titanium substrate.

6. The method as recited in claim 1, wherein the metallic layer includes cobalt.

7. The method as recited in claim 1, wherein the metallic layer includes copper.

8. The method as recited in claim 1, wherein the metallic layer includes nickel.

9. The method as recited in claim 1, wherein mechanically working the article includes peening the article using a 0.02 inch (0.51 millimeter) shot size at an Almen intensity of 0.015 to extend the residual stress region a depth of approximately 0.115 inches (2.921 millimeters) into the article.

10. A method of processing an article, comprising:
    forming a metallic layer on a titanium substrate to provide an article;
    diffusing together at least a portion of the metallic layer and at least a portion of the titanium substrate to form a diffusion region;
    mechanically working the article; and establishing a residual stress region that extends through the metallic layer, the diffusion region, and at least partially into the titanium substrate.

11. The method as recited in claim 10, including forming the metallic layer of at least one transition metal.

12. The method as recited in claim 10, including forming the metallic layer of a metal selected from the group consisting of cobalt, copper, nickel, and combinations thereof.

13. The method as recited in claim 10, including diffusing at a diffusion temperature corresponding to a type of metal selected for the metallic layer and the titanium substrate.

14. The method as recited in claim 10, including forming the metallic layer of nickel using a nickel strike solution.

* * * * *